United States Patent [19]

Maruyama

[11] Patent Number: 5,802,101
[45] Date of Patent: Sep. 1, 1998

[54] DIRECT SEQUENCE SS LAN STATION WITH REDUCED POWER CONSUMPTION AND METHOD FOR OPERATING THE SAME

[75] Inventor: Hidenori Maruyama, Tokyo, Japan

[73] Assignee: NEC Corporation, Japan

[21] Appl. No.: 646,130

[22] Filed: May 7, 1996

[30] Foreign Application Priority Data

May 10, 1995 [JP] Japan ................................. 7-111578

[51] Int. Cl.[6] .............................................. H04B 1/69
[52] U.S. Cl. .................................... 375/206; 455/343
[58] Field of Search ............................ 375/200, 219, 375/206; 455/343, 78, 79, 82, 83

[56] References Cited

U.S. PATENT DOCUMENTS

| 5,477,532 | 12/1995 | Hoshigami et al. | 455/82 |
| 5,524,274 | 6/1996 | Takahashi et al. | 455/83 |
| 5,694,420 | 12/1997 | Ohki et al. | 375/200 |

*Primary Examiner*—Temesghen Ghebretinsae
*Attorney, Agent, or Firm*—Ostrolenk, Faber, Gerb & Soffen, LLP

[57] ABSTRACT

In a waiting mode after transmission, a radio receiver is operated to convert a radio frequency signal into an intermediate frequency signal of which a signal level is checked. When the signal level is higher than a predetermined level, a reception mode starts for spectrum-despreading the intermediate frequency signal to provide a spectrum-despread signal and demodulating the spectrum-despread signal.

4 Claims, 4 Drawing Sheets

FIG. 3

| | WAITING | RX | TX |
|---|---|---|---|
| RADIO SECTION (RX) | O | O | X |
| RADIO SECTION (TX) | X | X | O |
| SIGNAL MODULATOR | X | X | O |
| SPREAD MODULATOR | X | X | O |
| A/D CONVERTER | X | O | X |
| DESPREAD DEMODULATOR | X | O | X |
| AMPLITUDE DETECTOR | X | O | X |
| SYNCHRONOUS INTEGRATOR | X | O | X |
| SYNCHRONOUS DETECTOR | X | O | X |
| SIGNAL DEMODULATOR | X | O | X |
| RECEPTION LEVEL CHECK CIRCUIT | O | O | O |
| POWER & CLOCK CONTROLLER | O | O | O |

O : ON    X : OFF

DIRECT SEQUENCE SS LAN STATION WITH REDUCED POWER CONSUMPTION AND METHOD FOR OPERATING THE SAME

BACKGROUND OF THE INVENTION

The present invention generally relates to a station of a local area network (hereafter "LAN") system and an operation method therefor, and particularly, to a station of a direct sequence (hereafter "DS") spread-spectrum (hereafter "SS") LAN system and a method for operating the same.

DESCRIPTION OF THE RELATED ART

With the computer network extending, the LAN system has an increased prosperity. Wired LANs have cables that need an installation place and sometimes look poor.

Recent years have observed wireless LANs in which a pair of stations in a BSS (basic service set) or ESS (extended service set) communicate with each other in an SS system.

The SS LAN allows an efficient use of radio waves with an anti-noise performance and has wide applications, in particular to data communications and mobile communications. The DS is a typical SS that consumes significant power. The SS may be a frequency hopping (hereafter "FH") type.

FIG. 1 shows a block diagram of a conventional station STA-1 in a DS LAN system.

The conventional station STA-1 comprises data terminal equipment (hereafter "DTE"), a transmission (hereafter "Tx")—reception (hereafter "Rx") circuit, and an antenna 4 with a select switch 4a for antenna selection between Tx and Rx.

The Tx-Rx circuit includes a signal modulator 1 for modulating a carrier with a data signal from the DTE to provide a signal-modulated carrier, a spread modulator 2 for modulating the signal-modulated carrier by a multiplication with a pseudo-noise (hereafter "PN") series or an applicable SS code sequence to provide a DS-spread carrier, and a radio section 3 for converting the DS-spread carrier into a radio frequency (hereafter "RF") signal that is transmitted as a radio wave from the antenna 4, as the select switch 4a is set on the Tx side.

After the signal transmission, the antenna select switch 4a is set on the Rx side so that radio waves received by the antenna 4 are input to the radio section 3, where they are each converted into an intermediate frequency (hereafter "IF") signal.

The Tx-Rx circuit further includes an analog-to-digital (hereafter "A/D") converter 5 for converting the IF signal into a digital signal, a despread demodulator 6 for demodulating the digital signal by a multiplication with a predetermined PN series or SS code sequence to provide a DS-despread signal, an amplitude detector 7 for detecting an amplitude of the DS-despread signal to provide a sequence of amplitude-representative symbols, a synchronous integrator 8 for integrating values of symbols output from the amplitude detector 7, a synchronous detector 9 responsible for an output of the synchronous integrator 8 to detect a synchronous signal, and a signal demodulator 10 for processing the amplitude-representative signal to demodulate a data signal to be output to the DTE, as the synchronous signal is input from the synchronous detector 9 to the despread demodulator 6 and the signal demodulator 10.

When the output from the synchronous integrator 8 has a level exceeding a threshold value, a synchronous carrier is detected with a decision that a reception has started. A reception waiting mode is then changed to a reception mode, where necessary actions are made for the reception. With a transmission request sent from the DTE, a transmission mode starts.

In a wireless LAN system, it is desirable for a station to be small in size and portable. It therefore is desirable for the station to be adaptive for a driving such as from a battery, and operable at a low rate of power consumption.

The conventional station STA-1 detects a power level of a despread signal in the waiting mode, and enters the reception mode when the detected level is higher than a predetermined value. In the reception mode, there are operated many flip-flops such as for e.g. DS-despread actions and amplitude detection by chips and in shift registers for synchronous integration, consuming large power. When the transmission request is sent from the DTE, the station STA-1 checks absence of reception before entering the transmission mode.

To reduce the power consumption, the reception may be started by using a level of despread signal as a trigger. For a detection of the level, however, there would be operated the radio section 3, A/D converter 5, despread demodulator 6, amplitude detector 7 and synchronous integrator 8, achieving little reduction of power consumption.

In the LAN, a station tends to be put in a waiting mode. Therefore, most components of the conventional station STA-1 are substantially kept operated, wasting much power.

The present invention has been achieved with such points in mind.

SUMMARY OF THE INVENTION

It therefore is an object of the present invention to provide a wireless DS LAN station and a method for operating the same, permitting an effective reduction of power consumption.

To achieve the object, a genus of the present invention provides a station for a wireless direct sequence spread spectrum LAN system, comprising: terminal equipment for providing a first data signal; transmission means for transmitting a first radio frequency signal representative of the first data signal; receiver means for receiving a second radio frequency signal and converting the second radio frequency signal into an intermediate frequency signal; demodulation means for spectrum-despreading the intermediate frequency signal to provide a spectrum-despread signal and demodulating the spectrum-despread signal to provide a second data signal; and control means responsible for a signal level of the intermediate frequency signal higher than a predetermined level to start driving the demodulation means.

According to a species of the genus of the invention, the control means is responsible for a header of the first data signal to stop driving the receiver means and driving the demodulation means and to start driving the transmission means.

According to an individual of the species of the invention, the control means is responsible for an ending of the first data signal to stop driving the transmission means and to start driving the receiver means.

Further, to achieve the object described, another genus of the present invention provides a method for operating a station for a wireless direct sequence spread spectrum LAN system, the station including terminal equipment for providing a first data signal, transmission means for transmitting a first radio frequency signal representative of the first data signal, receiver means for receiving a second radio frequency signal and converting the second radio frequency signal into an intermediate frequency signal, and demodulation means for spectrum-despreading the intermediate frequency signal to provide a spectrum-despread signal and demodulating the spectrum-despread signal to provide a second data signal, the method comprising the steps of: stopping the transmission means; driving the receiver means; and responding to a signal level of the intermediate frequency signal higher than a predetermined level to start driving the demodulation means.

According to the genera of the invention, an operation of demodulation means can be interrupted during a waiting mode of a station of a DS type SS LAN system.

BRIEF DESCRIPTION OF THE DRAWINGS

The objects, features and advantages of the present invention will become more apparent from consideration of the following detailed description, in conjunction with the accompanying drawings, in which:

FIG. 3 is a component operation table of the station of FIG. 2; and

DESCRIPTION OF THE PREFERRED EMBODIMENTS

Figure 1:
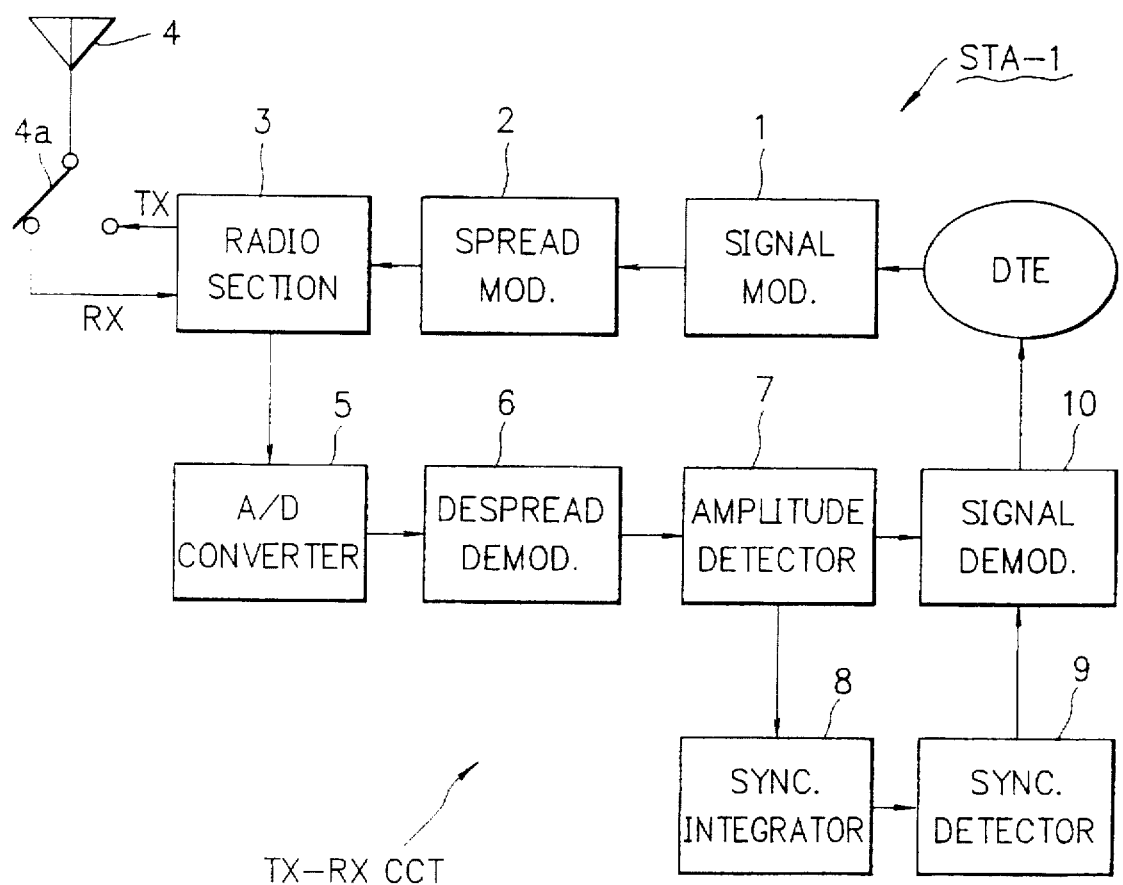
FIG. 1 is a block diagram of a conventional station of a DS LAN system.

There will be detailed below the preferred embodiments of the present invention, with reference to the accompanying drawings. Like members are designated by like reference characters.

Figure 2:
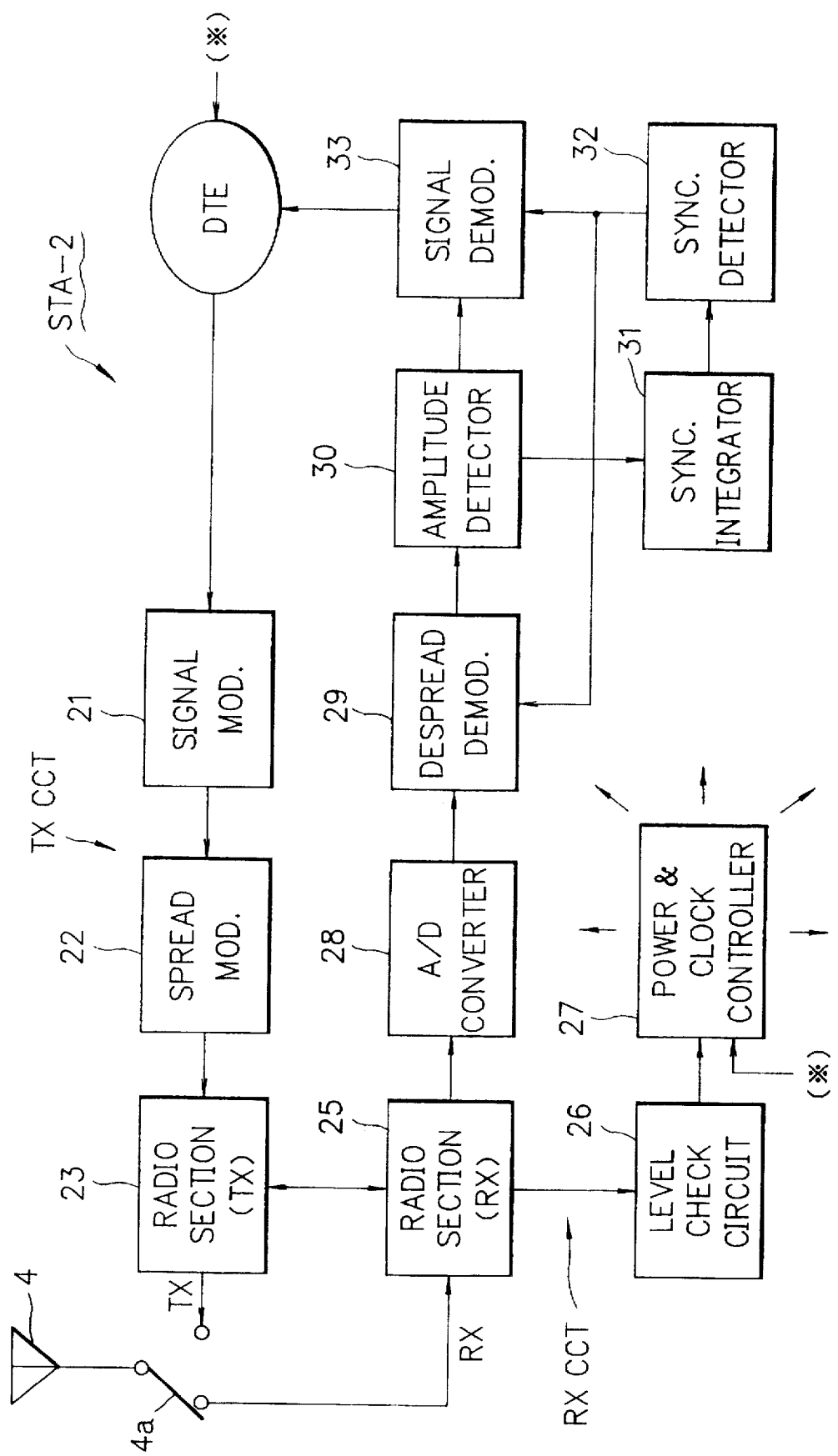
FIG. 2 is a block diagram of a station of a DS LAN system according to an embodiment of the invention.

FIG. 2 shows a block diagram of a station STA-2 of a DS LAN system according to an embodiment of the invention.

The station STA-2 comprises DTE, a Tx circuit, an antenna 4 and an Rx circuit.

The Tx circuit comprises: a signal modulator 21 for modulating a carrier with a data signal from the DTE to provide a signal-modulated carrier; a spread modulator 22 for modulating the signal-modulated carrier by a multiplication with a PN series or an applicable SS code sequence to provide a DS-spread carrier; and a radio Tx section 23 including a combination of amplifiers and filters for converting the DS-spread carrier into an RF signal that is transmitted as a feeble radio wave from the antenna 4, as the station STA-2 is in a Tx mode and a select switch 4a is set on its Tx side.

After the signal transmission, the station STA-2 enters a waiting mode and the select switch 4a is set on its Rx side so that radio waves caught by the antenna 4 are input as received RF signals to the Rx circuit.

The Rx circuit comprises: a radio Rx section 25 including a combination of amplifiers and filters for converting each received RF signal into an IF signal; a reception level check circuit 26 including an amplifier for amplifying the IF signal, a rectifier for rectifying the amplified signal, a smoothing circuit for smoothing the rectified signal and a comparator for comparing a signal level of the smoothed signal with a predetermined level to make a decision of entering an Rx mode, when the signal level is higher than the predetermined level; and a power and clock controller 27 for controlling power supply voltages and clocks to be distributed, as required in the station STA-2.

The Rx circuit further comprises: an A/D converter 28 for converting the IF signal of the radio Rx section 25 into a digital signal; a despread demodulator 29 for demodulating the digital signal by a multiplication with a predetermined PN series or SS code sequence to provide a DS-despread signal; an amplitude detector 30 for detecting an amplitude of the DS-despread signal to provide a sequence of amplitude-representative symbols; a synchronous integrator 31 for integrating values of symbols output from the amplitude detector 30; a synchronous detector 32 responsible for an output of the synchronous integrator 31 to detect a synchronous signal; and a signal demodulator 33 for processing the amplitude-representative signal to demodulate a data signal to be output to the DTE, as the synchronous signal is input from the synchronous detector 32 to the despread demodulator 29 and the signal demodulator 33.

The radio Tx and Rx sections are analog circuits, while the other components are digital circuits.

There will be described below circuit actions of the station STA-2.

Figure 4:
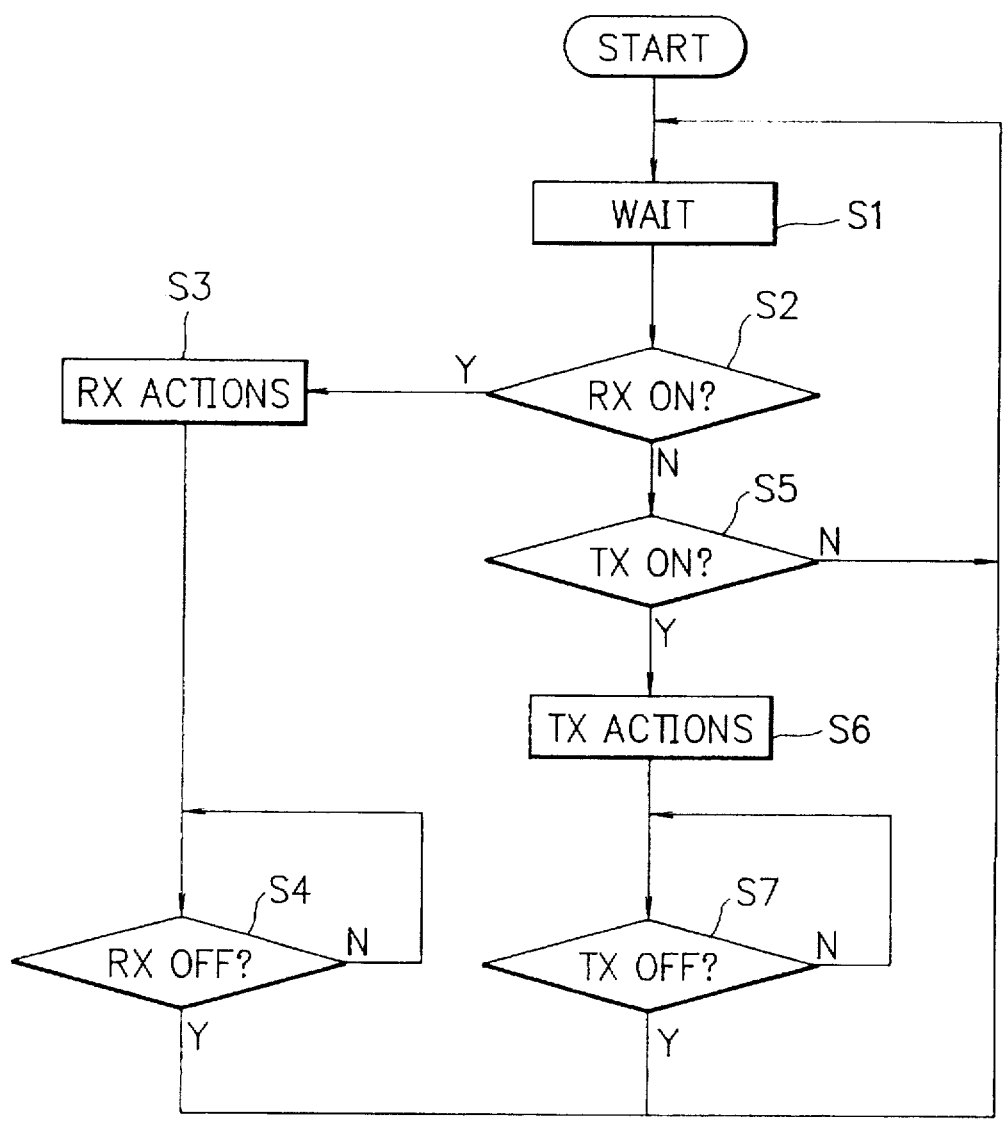
FIG. 4 is a flow chart of actions of the station of FIG. 2.

FIG. 3 shows a component operation table of the station STA-2, and FIG. 4, a flow chart of the circuit actions.

When initially powered on, at a step S1 (FIG. 4), the station STA-2 stands in the waiting mode, where the radio Rx section 25, the reception level check circuit 26 and the power and clock controller 27 are operated (cf. "WAITING" column, FIG. 3) so that the controller 27 does not supply power to the radio Tx section 23 nor clocks for operation to the signal modulator 21, spread modulator 22, A/D converter 28, despread demodulator 29, amplitude detector 30, synchronous integrator 31, synchronous detector 32 and signal demodulator 33. The interruption of clock supply may be combined with or replaced by that of power supply.

At a step S2, it is decided whether or not the Rx mode should be on, by checking if the IF signal has a higher level than predetermined.

If the signal level is higher than predetermined, the flow goes to step S3 so that the station STA-2 enters the Rx mode (cf. Rx column, FIG. 3), where the controller 27 operates (i.e. drives) the remaining components of the Rx circuit, including the A/D converter 28, despread demodulator 29, amplitude detector 30, synchronous integrator 31, synchronous detector 32 and signal demodulator 33, as well as the radio Rx section 25 and level check circuit 26.

At a step S4, as the reception is completed, the flow goes to the step S1.

The flow may go to the step S1 when the despread demodulator 29 has a mean value of the output thereof kept under a predetermined value for a predetermined time interval.

Unless the signal level at the step S2 is higher than predetermined, it is decided at a step S5 whether the Tx mode is requested or not.

Unless the Tx mode is requested, the flow goes to the step S1.

If the Tx mode is requested at the step S5, the flow goes to a step S6 so that the station STA-2 enters the Tx mode (cf. Tx column, FIG. 3), where the controller 27 operates the signal modulator 21, spread modulator 22 and radio Tx section 23.

At a step S7, as the transmission is completed, the flow goes to the step S1.

In the present embodiment, the DTE may preferably be a packet mode terminal adapted for e.g. handling a burst of data cells having a header and/or an end delimiter.

The header may include a request for transmission and information on a total number of bits to be transmitted or received, so that the DTE can inform the controller 27 of the timings for the Tx mode to start and stop driving the Tx circuit, as well as the timing for the Rx mode to stop driving demodulation circuitry consisting of the members 28, 29, 30, 31, 32 and 33.

The end delimiter in a transmitting or received burst may also be employed to determine the timing to stop driving the Tx circuit or demodulation circuitry.

Moreover, in the embodiment described, the level check circuit 26 may incidentally respond to a significant level exceeding the predetermined level due to an SS transmission to another station than the STA-2.

In such the case, the demodulation circuitry will undergo a false Rx action to output ineffective noises, consuming correspondent power.

However, in actual, the frequency of such false Rx actions should be very low. Still less, associated power consumption should be as small as neglectable.

In this respect, the DTE has an unshown watch dog timer for detecting an interval of time elapsed after a commencement of the Rx mode, without significant data input from the signal demodulator 10 to the DTE, and a programmed action to decide, when the detected time interval has exceeded a predetermined critical value, that a current Rx mode should be ended. The commencement of Rx mode may be informed directly from the controller 27 to the DTE, or detected by the DTE as it receives an output of the signal demodulator 10.

It will be seen that a decision at each of the steps S2, S4, S5 and S7 may be implemented in a voluntary manner.

Further, the demodulation circuitry may be modified in a variety of known manners to implement DS communications.

Still more, the radio Rx section 25 cooperative with the radio Tx section 23 for various purposes (e.g. for use of a common circuit or common control signal) may well be controlled independently therefrom.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A station for a wireless direct sequence spread spectrum LAN system, comprising:

terminal equipment for providing a first data signal;

transmission means for transmitting a first radio frequency signal representative of the first data signal;

receiver means for receiving a second radio frequency signal and converting the second radio frequency signal into an intermediate frequency signal;

demodulation means for spectrum-despreading the intermediate frequency signal to provide a spectrum-despread signal and demodulating the spectrum-despread signal to provide a second data signal; and control means responsive to a signal level of the intermediate frequency signal higher than a predetermined level to start driving the demodulation means by applying power thereto.

2. A station for a wireless direct sequence spread spectrum LAN system, comprising:

terminal equipment for providing a first data signal;

transmission means for transmitting a first radio frequency signal representative of the first data signal;

receiver means for receiving a second radio frequency signal and converting the second radio frequency signal into an intermediate frequency signal;

demodulation means for spectrum-despreading the intermediate frequency signal to provide a spectrum-despread signal and demodulating the spectrum-despread signal to provide a second data signal; and control means responsive to a signal level of the intermediate frequency signal higher than a predetermined level to start driving the demodulation means, the control means being responsive to a header of the first data signal to stop driving the receiver means and driving the demodulation means and to start driving the transmission means.

3. The station according to claim 2, wherein the control means is responsive to an ending of the first data signal to stop driving the transmission means and to start driving the receiver means.

4. A method for operating a station for a wireless direct sequence spread spectrum LAN system, the station including terminal equipment for providing a first data signal, transmission means for transmitting a first radio frequency signal representative of the first data signal, receiver means for receiving a second radio frequency signal and converting the second radio frequency signal into an intermediate frequency signal, and demodulation means for spectrum-despreading the intermediate frequency signal to provide a spectrum-despread signal and demodulating the spectrum-despread signal to provide a second data signal, the method comprising the steps of:

stopping the transmission means;

driving the receiver means; and responding to a signal level of the intermediate frequency signal higher than a predetermined level to start driving the demodulation means by applying power thereto.

* * * * *